United States Patent

[11] 3,622,263

[72] Inventors: Manfred Groll, Cologne-Stammheim; Hans-Samuel Bien, Burscheid; Ernst-Robert Fritze, Cologne-Flittard, all of Germany
[21] Appl. No.: 742,487
[22] Filed: July 5, 1968
[45] Patented: Nov. 23, 1971
[73] Assignee: Farbenfabriken Bayer Aktiengesellschaft, Leverkusen, Germany
[32] Priority: July 13, 1967
[33] Germany
[31] F 52943

[54] PROCESS FOR THE DYEING OF POLYAMIDE TEXTILES WITH METAL PHTHALOCYANINE DYESTUFFS
9 Claims, No Drawings

[52] U.S. Cl. .................................................. 8/178, 8/1X, 260/314.5
[51] Int. Cl. .................................................. D06p 3/24
[50] Field of Search .................................................. 8/1.3, 178; 260/314.5

[56] References Cited
UNITED STATES PATENTS

| | | | |
|---|---|---|---|
| 2,683,643 | 7/1954 | Baumann et al. | 8/1.3 |
| 3,051,720 | 8/1962 | Minnich | 260/314.5 |
| 3,059,988 | 10/1962 | Koller et al. | 8/1.3 X |

Primary Examiner—George F. Lesmes
Assistant Examiner—T. J. Herbert
Attorney—Plumley, Tyner & Sandt ABSTRACT: The process for dyeing synthetic super polyamides with metal phthalocyanine sulfonic acids wherein the improvement comprises applying a phthalocyanine containing 2–3 sulfonic acid groups in the 4- or 5-position of their benzene nuclei to provide dyeings of improved light-fastness.

PROCESS FOR THE DYEING OF POLYAMIDE TEXTILES WITH METAL PHTHALOCYANINE DYESTUFFS

It has been found that phthalocyanines which contain a total of 2 to 3 sulfonic acid groups in the 4- or 5-positions of their benzene nuclei are suitable for the dyeing of polyamides.

It is known that phthalocyanines which carry 2 to 3 sulfonic acid groups in the 3- or 6-positions of their benzene nuclei are suitable for the dyeing of cotton as well as for the dyeing of polyamides on account of their good drawing power. On the other hand, phthalocyanines the sulfonic acid groups of which stand in the 4- or 5-positions of the benzene nuclei of the phthalocyanine molecule have only a very poor affinity to cotton. For this reason, they have not hitherto attained any importance in practice. Surprisingly, however, these phthalocyanine-sulfonic acids have a good to very good affinity to polyamide fibers.

Compared with the phthalocyanine-sulfonic acids the sulfonic acid groups of which stand in the 3- or 6-position of the phthalocyanine molecule, the dyestuffs whose sulfonic acids groups stand in the 4- or 5-positions of the benzene nuclei of the phthalocyanine molecule have advantages in respect of their fastness to acid, bleaching, sulfur and exhaust fumes. Moreover, they are markedly superior to the first-mentioned dyestuffs with regard to their fastness to light. Dyeing of polyamide materials, preferably synthetic super polyamide fibers, with these dyestuffs is carried out in the usual manner from a neutral or weakly acidic solution with the addition of conventional dyeing auxiliaries, such as e.g., sodium sulfate, acetic acid, formic acid.

A great variety of phthalocyanine-sulfonic acids can be used for the process according to the invention, such as Co-, Ni- and metal-free phthalocyanines, but primarily Cu-phthalocyanine-sulfonic acids. Besides their sulfonic acid groups, the aforesaid phthalocyanines may contain 1 to 2 sulfonic acid amide or monoalkylamide groups (alkyl $\times$ $C_1$-$C_4$) in the molecule. The benzene nuclei of the phthalocyanine molecules which are not substituted by sulfonic acid groups may contain one to two halogen atoms, such as chlorine, bromine or fluorine, lower alkyl groups, such as methyl or ethyl groups or lower alkoxy groups containing one to three carbon atoms. The dyestuffs are preferably used for dyeing in the form of their alkali metal salts. Examples of phthalocyanines used according to the invention are copper-, cobalt- or nickel-phthalocyanines which contain two or three sulfonic acids in the 4-position.

The phthalocyanine-sulfonic acids used can be obtained, for example, starting from phthalic acid-4-sulfonic acid or its derivatives, such as phthalic acid anhydride-4-sulfonic acid, phthalimide-4-sulfonic acid, phthalic acid diamide-4-sulfonic acid, with phthalic acid or its derivatives, such as phthalic acid anhydride, phthalic acid imide, 4-chlorophthalic acid, 4-chlorophthalic acid imide, phthalic acid-4-sulfamide, in an urea melt.

On the other hand, phthalocyanines with 3–4 sulfonic acid groups in the molecule can also be converted, for example, the thionyl chloride and with the aid of chlorosulfonic acid into their sulfonic acid chlorides or sulfonic acid chloride-sulfonic acids and these can then be partially reacted with ammonia or a monalkylamine ($C_1$-$C_4$).

EXAMPLE 1 a. Ten parts of strand material of polyamide prepared by condensation of caprolactum are pretreated at 40° C. for 15–20 minutes in a liquor consisting of 400 parts of water, 0.4 parts of 30 percent acetic acid and 2 parts sodium sulfate. A solution of 0.1 part of the sodium salt of copper-phthalocyanine-(4)-di- to -trisulfonic acid (statistic value 2.5 sulfonic acid groups per Pc-molecule) in 10 parts of water is subsequently added. The temperature of the bath is raised to boiling point within 30 minutes and dyeing is performed for 1 to 1½ hours. The fiber is then rinsed hot once, then rinsed cold and dried. A brilliant blue dyeing of good fastness properties, especially an excellent fastness to light, is obtained.

b. The dyestuff used in example 1(a) was obtained, starting from the potassium salt of phthalic acid-4-sulfonic acid and phthalic acid anhydride, in an urea melt with the addition of the compounds conventionally used for a phthalocyanine melt.

c. When replacing the sodium salt of copper phthalocyanine-(4)-di- to -trisulfonic acid used in example 1a by an equimolecular amount of a dyestuff mixture consisting of equal parts of the sodium salt of 4,4''-di-methoxy-copper-phthalocyanine-(4',4''')-di-sulfonic acid and the sodium salt of 4-methoxy-copper-phthalocyanine-(4', 4'', 4''')-tri-sulfonic acid (prepared from the potassium salt of phthalic acid-(4)-sulfonic acid and 4-methoxy-phthalic acid, in an urea melt with the addition of the compounds conventionally used for a phthalic acid metal), there is obtained a brilliant, greenish-turquoise dyeing of good fastness properties, especially very good fastness to light.

d. When replacing the sodium salt of copper-phthalocyanine-(4)-di- to -tri-sulfonic acid used in example 1a by an equimolecular quantity of a dyestuff mixture consisting of equal parts of the sodium salt of 4,5,4'',5''-tetra-chloro-copper-phthalocyanine-(4',4''')-disulfonic acid and the sodium salt of 4,5-chloro-copper-phthalocyanine-(4',4'',4''')-tri-sulfonic acid (prepared from the potassium salt of phthalic acid-(4)-sulfonic acid and 4,5-dichloro-phthalic acid, in an urea melt with the addition of the compounds conventionally used for a phthalocyanine melt), there is obtained a brilliant, turquoise-blue dyeing of good fastness properties, especially outstanding fastness to light.

EXAMPLE 2 a. Ten parts of strand material of synthetic polyamide fibers is pretreated at 40° C. for 15–20 minutes in a liquor consisting of 200 parts of water, 0.4 parts of 30 percent acetic acid and 2 parts sodium sulfate. A solution of 0.1 part of the sodium salt of copper-phthalocyanine-(4)-di- to -tri-sulfonic acid (statistic value 2.8 sulfonic acid groups per Pc-molecule) in 10 parts of water is subsequently added. The bath temperature is raised to 100° C. within 30 minutes, dyeing is carried out for 30–45 minutes, 0.4 parts of 85 percent formic acid are added and dyeing is continued at boiling temperature for another 30 minutes. The fiber is subsequently rinsed hot once, then rinsed cold and dried. A brilliant dyeing of good fastness properties, especially a very good fastness to light, is obtained.

b. The dyestuff used in example 2(a) was obtained, starting from the potassium salt of phthalic acid-4-sulfonic acid and phthalic acid anhydride, in an urea melt with the addition of the compounds conventionally used for a phthalocyanine melt.

c. If the sodium salt of copper-phthalocyanine-(4)-di- to -tri-sulfonic acid mentioned in example 2(a) is replaced with 0.1 part of the sodium salt of nickel-phthalocyanine-(4)-di- to -tri-sulfonic acid (statistic value 2.8 sulfonic acid groups per Pc-molecule), then there is obtained a somewhat more greenish turquoise-blue dyeing of good fastness properties, especially a very good fastness to light.

EXAMPLE 3 a. Ten parts of a fabric of synthetic polyamide fibers are pretreated at 40° C. for 15 to 20 minutes in a liquor consisting of 200 parts to 400 parts of water and 0.2 to 0.4 parts oleyl polyglycol ether. A solution of 0.1 part of the sodium salt of copper-phthalocyanine-(4)-di- to -tri-sulfonic acid (statistic value 2.5 sulfonic acid groups per Pc-molecule) in 10 parts of water is subsequently added. The bath temperature is raised to boiling point within 30 minutes and dyeing is performed for 1–1½ hours. The fabric is subsequently rinsed hot once and then rinsed cold and dried. A brilliant blue dyeing of good to very good fastness properties, especially an excellent fastness to light, is obtained.

b. The dyestuff used in example 3(a) was obtained in analogy with example 1(b).

EXAMPLE 4 a. Ten parts of strand material of synthetic polyamide fibers are pretreated at 40° C. for 15 to 20 minutes in a liquor consisting of 400 parts of water, 0.4 parts of 30 percent acetic acid, 2 parts sodium sulfate and 0.8 parts of the sodium salt of a highly condensed naphthalene-sulfonic acid-formaldehyde resin. A solution of 0.1 part of the sodium salt of copper-phthalocyanine-(4)-di- to -tri-sulfonic acid (statistic value 2.5 sulfonic acid groups per Pc-molecule) in 10 parts of water is subsequently added. The bath temperature is raised to boiling point within 30 minutes and dyeing is performed for 1 to 1½ hours. The fiber is subsequently rinsed hot once and then rinsed cold and dried. A brilliant turquoise-blue dyeing of good fastness properties, especially a very good fastness to light, is obtained.

b. The dyestuff used in paragraph 1 was obtained as desired in example 1(b).

We claim:

1. In the process for the dyeing of synthetic super polyamide textile materials with metal-phthalocyanine sulfonic acid dyestuffs devoid of sulfonamide chromophoric substituents, the improvement which comprises dyeing said synthetic super polyamide textile material with said phthalocyanine containing 2 to 3 sulfonic acid groups in the 4-position of their benzene nuclei.

2. Process according to claim 1 wherein the benzene nuclei of the phthalocyanine may contain a further substituent selected from the group consisting of sulfonamide and $C_{1-4}$ alkyl sulfonamide and the benzene nuclei which do not contain the sulfonic acid groups may contain one or two substituents selected from the group consisting of halogen, lower alkyl, and lower alkoxy.

3. Process according to claim 2 wherein said phthalocyanine is a nickel-phthalocyanine, containing 2 or 3 sulfonic acid groups in the 4-position of their benzene nucleus.

4. Process according to claim 2 wherein said phthalocyanine is copper-phthalocyanine-(4,4'')-disulfonic acid.

5. Process according to claim 2 wherein said phthalocyanine is copper-phthalocyanine-(4,4',4'')-trisulfonic acid.

6. Process according to claim 2 wherein said phthalocyanine is nickel-phthalocyanine-(4,4'')-disulfonic acid.

7. Process according to claim 2 wherein said phthalocyanine is nickel-phthalocyanine-(4,4',4'')-trisulfonic acid.

8. Process according to claim 2 wherein said phthalocyanine is 4-mono-methoxy-copper-phthalocyanine-(4',4'',4''')-trisulfonic acid.

9. Process according to claim 2 wherein said phthalocyanine is 4,5-dichloro-copper-phthalocyanine-(4',4'',4''')-tri-sulfonic acid.

* * * * *